United States Patent [19]

Nitzinger et al.

[11] Patent Number: 4,880,955
[45] Date of Patent: Nov. 14, 1989

[54] BAKING OVEN HAVING A LIGHTING DEVICE WITH A LOW VOLTAGE AND/OR HALOGEN BULB

[75] Inventors: Karl Nitzinger, Traunreut; Josef Gerl, Palling; Herbert Steiner, Traunstein; Helmut Hess, Traunreut, all of Fed. Rep. of Germany

[73] Assignee: Bosch-Siemens Hausgeräte GmbH, Munich, Fed. Rep. of Germany

[21] Appl. No.: 134,930

[22] Filed: Dec. 18, 1987

[30] Foreign Application Priority Data

Dec. 18, 1986 [DE] Fed. Rep. of Germany ....... 3643371

[51] Int. Cl.⁴ .................. H05B 6/64; F21V 33/00
[52] U.S. Cl. ................. 219/10.55 R; 219/10.55 B; 219/10.55 E; 219/391; 362/92; 126/19 R
[58] Field of Search ............ 219/10.55 R, 10.55 B, 219/10.55 D, 10.55 E, 391, 342, 201, 202; 362/92; 126/19 R, 255, 275 R

[56] References Cited

U.S. PATENT DOCUMENTS

| | | | |
|---|---|---|---|
| 3,733,706 | 2/1956 | Feder | 219/391 |
| 4,326,243 | 4/1982 | Pistor et al. | 362/92 X |
| 4,559,585 | 12/1985 | Almgren et al. | 362/92 |
| 4,621,180 | 11/1986 | Kristof et al. | 219/10.55 R |
| 4,763,638 | 8/1988 | Hurley et al. | 219/10.55 B X |

FOREIGN PATENT DOCUMENTS 2187369 9/1987 United Kingdom ........ 219/10.55 A

OTHER PUBLICATIONS

Installation Instructions, "SM-11 Battery Operated 12 VDC Microwave Oven" (3 pages available only), Oct. 1986.

*Primary Examiner*—Philip H. Leung
*Attorney, Agent, or Firm*—Herbert L. Lerner; Laurence A. Greenberg

[57] ABSTRACT

A baking oven includes at least one boundary wall defining a baking space and at least one lighting device each including a first part in the form of a low-voltage bulb, a second part in the form of an electrical connection for the bulb, and a lamp socket disposed on the at least one boundary wall. The lamp socket receives the bulb from inside the baking space with the bulb protruding substantially completely into the baking space. The boundary wall has an opening formed therein for receiving and closely surrounding one of the parts of the lighting device.

21 Claims, 3 Drawing Sheets

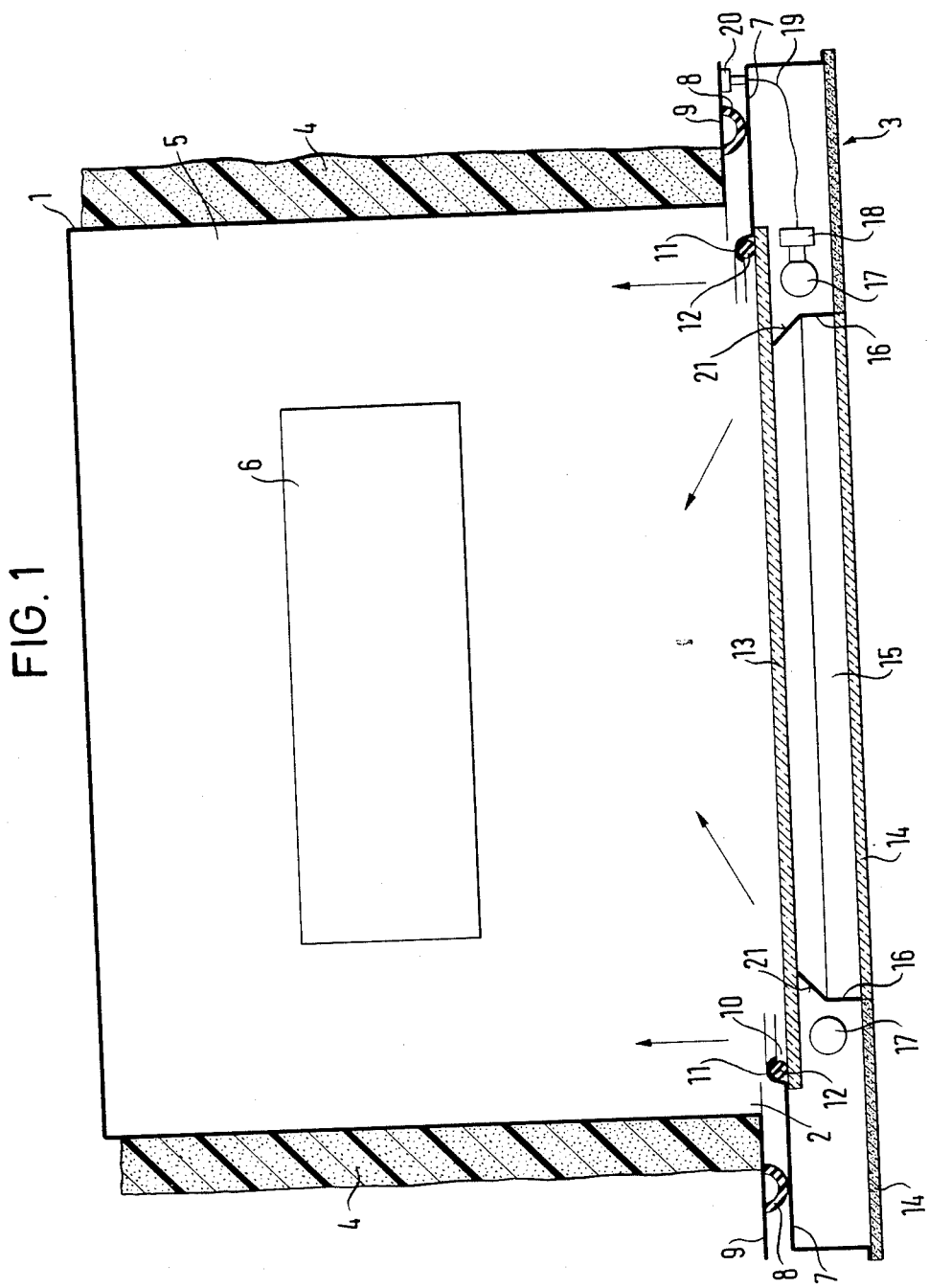

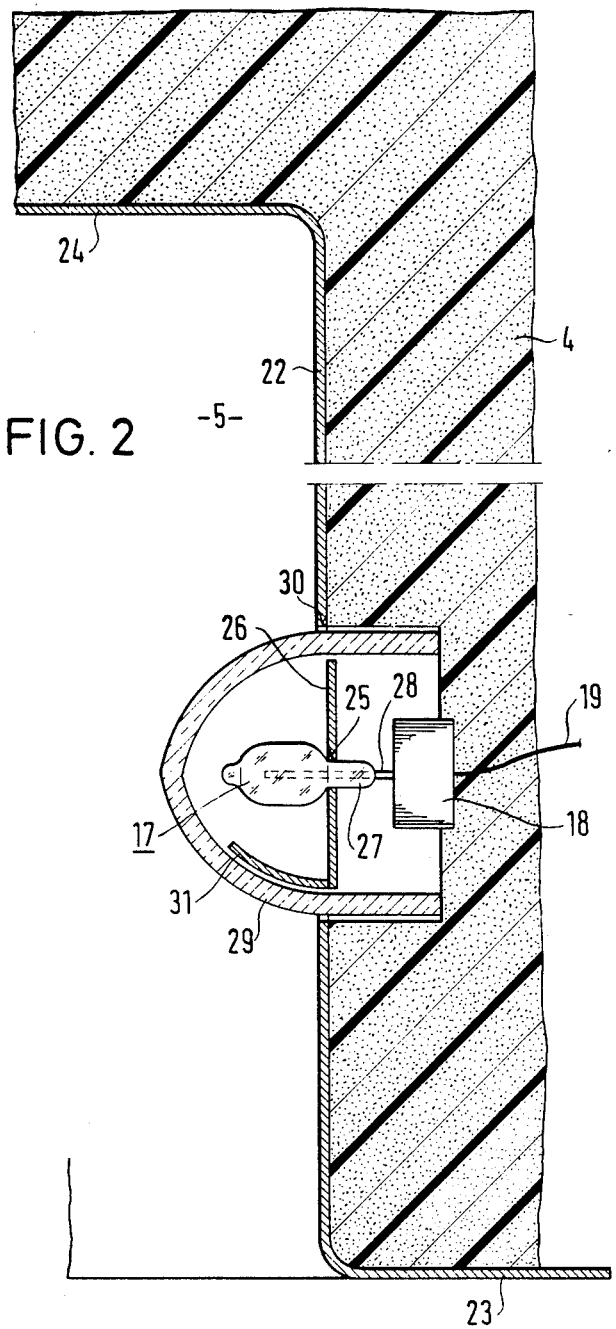

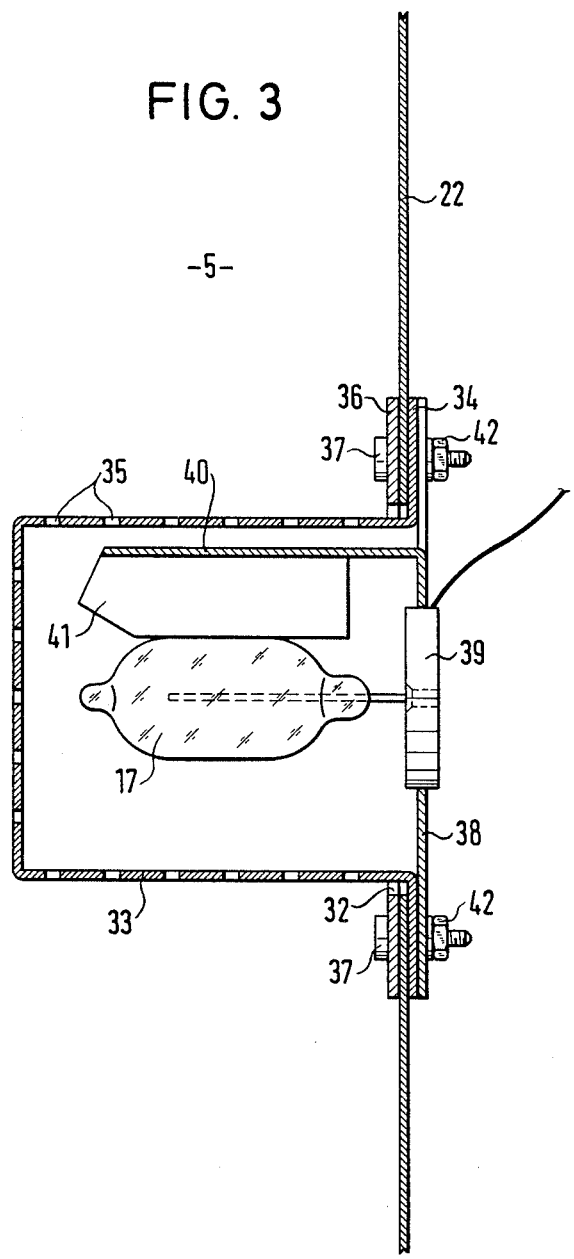

BAKING OVEN HAVING A LIGHTING DEVICE WITH A LOW VOLTAGE AND/OR HALOGEN BULB

SPECIFICATION:

The invention relates to a lighting device for a baking oven having a bulb with a lamp socket on at least one boundary wall of the baking space, the bulb may be introduced into the lamp socket from the baking space.

Incandescent bulbs that are typically used in conventional lighting devices for ovens have an operating voltage of 220 volts and a power consumption of 25 watts. To this end, a relatively large opening is provided in the muffle wall, which can be covered with a glass covering and behind which a metal holder for a lamp socket is mounted. The bulb is located essentially in a hollow space intended for lighting units, behind the muffle wall. A lighting device of this type is known from German Published, Non-Prosecuted Application DE-OS 29 13 542. During bulb operation in such a device, there is a relatively severe heat buildup, which also extends to the vicinity of the lamp socket and the metal holder. In order to avoid overheating at this point, the heat must be dissipated to the outside. In order to dissipate the heat, a break is typically made in the heat insulation layer that otherwise surrounds the baking oven muffle, in the vicinity of the metal holder. A pronounced thermal transport also takes place at this point because of the relatively large muffle opening leading from the baking space, especially during pyrolytic or self-cleaning operation of the oven. The muffle opening must be large enough to permit the relatively large-volume bulb to be easily mounted from the inside of the baking oven. This kind of thermal transport toward the outside is relatively unproblematic if the lighting device is located at the back of the baking oven, where heat dissipation does not present great difficulties. It becomes problematic if the lighting device is to be attached to one or both side muffle walls. In such a case, particularly in built-in ovens, lateral heat dissipation should be avoided as much as possible, because of the built-in furniture or appliances immediately adjacent the oven. To this end, the thermal insulation layer should remain uninterrupted along these side muffle walls as much as possible. Installing such lighting devices in the vicinity of the aforementioned side walls is also problematic, because little installation space is available on the sides in contrast to the back wall of the muffle.

It is accordingly an object of the invention to provide a lighting device for an oven, which overcomes the hereinafore-mentioned disadvantages of the heretofore-known devices of this general type and which avoids further geometrical or thermal difficulties in terms of placing the lighting device so as to attain optimal illumination of the baking space.

With the foregoing and other objects in view there is provided, in accordance with the invention, a baking oven, comprising at least one boundary or limiting wall defining a baking space, at least one lighting device each including a first part in the form of a low-voltage bulb, a second part in the form of an electrical connection for the bulb, and a lamp socket disposed on the at least one boundary wall having means for receiving the bulb in the lamp socket from inside the baking space with the bulb protruding substantially completely into the baking space, the boundary wall having an opening formed therein for receiving and closely surrounding one of the parts of the lighting device.

In accordance with another feature of the invention, the at least one boundary wall having the opening is a muffle wall with one surface facing toward the baking space and another surface facing away from the baking space, the lamp socket faces the other surface of the muffle wall, the bulb includes a lamp base portion and a connection portion, and only one of the portions protrudes through the opening up to the lamp socket.

In accordance with a further feature of the invention, the low-voltage bulb has an operating voltage of substantially 12 volts.

In accordance with an added feature of the invention, the low-voltage bulb has an installed power consumption of 5 watts.

In accordance with an additional feature of the invention, the low-voltage bulb is a halogen lamp.

The use of a low-voltage bulb, especially a halogen lamp which is known per se, makes it possible to keep the incident very low heat during operation of the bulb, so that special means for heat dissipation are unnecessary. In particular, there is no further necessity for interrupting the thermal insulating layer and therefore the lighting devices can preferably be disposed on the side muffle walls, where excellent illumination of the baking space is attained. Furthermore, such low-voltage bulbs and lamp sockets associated therewith are small enough to only require a very small installation space for the disposition thereof. At the same time, since the low-voltage bulb is so small, the opening in the particular muffle wall can be kept small enough to prevent a substantial emission of heat through the opening during operation of the baking oven.

The small size of the low-voltage bulb, for instance a halogen lamp, also makes it possible to allow a substantial portion of the bulb to protrude into the baking space, so that the best possible illumination of the baking space can be obtained.

In accordance with yet another feature of the invention, there is provided a reflector disposed in the vicinity of the opening.

In accordance with yet a further feature of the invention, the reflector is part of the muffle wall and has the opening formed therein, and the muffle wall has another opening formed therein being larger than the opening in the reflector, the reflector being disposed in the other opening. In other words, in the vicinity of the opening, the muffle wall itself a reflector.

In accordance with yet an added feature of the invention, the lighting device is disposed on at least one side muffle wall.

In accordance with yet an additional feature of the invention, there is provided a an oven door, and a shade shielding the bulb from the oven door.

In accordance with still another feature of the invention, the shade is part of a reflector disposed in the vicinity of the opening.

Blinding brightness when a person looks into the baking space can be avoided by providing the shade.

In accordance with still a further feature of the invention, there is provided an at least partially transparent glass covering mounted on the muffle wall and covering the bulb.

In accordance with still an added feature of the invention, the part of the glass covering is in the form of a shade.

In accordance with still an additional feature of the invention, the at least one boundary wall is an oven muffle having one surface facing toward the baking space and another surface facing away from the baking space, the lamp socket is secured so as to face the other surface of the muffle wall, and there is provided a thermal insulating layer covering the lamp socket and surrounding the oven muffle.

In accordance with again another feature of the invention, there is provided an oven door in which the lighting device is disposed.

In accordance with again a further feature of the invention, the oven door includes a viewing window having two sides and an inner glass panel, and the lighting device also includes another bulb in another lamp socket, one of the bulbs and one of the lamp sockets being disposed beyond each respective side of the viewing window, and the bulbs being covered by the inner glass panel.

In accordance with again an added feature of the invention, the viewing window has an aperture, and the oven door has a strut or stringer surrounding the aperture, the strut having an outer surface in the form of a reflector facing toward the bulb bulbs.

The small dimensions of low-voltage bulbs of the conventional type favors such a construction in a particularly advantageous manner. The result, in terms of the illumination of the baking space, is optimal lighting conditions, because the lighting device is disposed outside the viewing window of the baking door so that it is not visible to the observer, and the side of the food being baked that faces the observer is illuminated.

In accordance with again an additional feature of the invention, there is provided a plug contact disposed between the oven muffle and the oven door for electrically connecting the lighting device.

In accordance with another feature of the invention, there is provided a a current conducting rail disposed between the oven muffle and the oven door for electrically connecting the lighting device.

In accordance with a further feature of the invention, there are provided a means for heating the oven by microwave energy.

In accordance with an added feature of the invention, there is provided a grid-like, microwave-tight covering mounted on the boundary wall.

In accordance with an additional feature of the invention, the boundary wall has one surface facing toward and another surface facing away from the baking space, and there is provided a holder plate secured on the other surface of the boundary wall in the vicinity of the opening formed therein for retaining the lamp socket.

In accordance with a concomitant feature of the invention, the holder plate has a bent-over extension protruding through the opening formed in the boundary wall up to the grid-like covering, the extension being in the form of a shade and a reflector.

Other features which are considered as characteristic for the invention are set forth in the appended claims.

Although the invention is illustrated and described herein as embodied in a lighting device for an oven, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, cross-sectional view of a baking oven having a door and a lighting device built into the baking oven door;

FIG. 2 is an enlarged, fragmentary, cross-sectional view of a side muffle wall of a baking oven, having a lighting device mounted therein; and FIG. 3 is a fragmentary, cross-sectional view of another embodiment of a lighting device.

Referring now to the figures of the drawings in detail and first, particularly, to FIG. 1 thereof, there is seen a cross-sectional plan view of a baking oven having a block-shaped metal oven muffle 1, the service opening 2 of which is to be closed with a baking oven door 3. The oven muffle 1 is surrounded toward the outside by a thermal insulating layer 4. Food 6 such as a cake that is to be baked, is placed in the interior of a baking space or chamber 5. The door 3 has a box-shaped structure and a door bottom 7, with which the door 3 is supported on an elastic gasket 8 in the closing position. The elastic gasket 8 may be disposed on a muffle flange 9 of the oven muffle, so as to surround the opening. The door bottom has a recess 10 formed therein, which may be rectangular in shape and is defined by surrounding recess flanges 11, which are curved in approximately the shape of a semicircle and have another surrounding gasket 12 disposed therein. An inner glass panel 13 is supported on the gasket 12. The outer surface of the door 3 facing toward the front of the door 3 is formed by a further larger glass panel 14. In order to obtain an outlined viewing window 15 in the oven door 3, a surrounding window strut or crossbeam 16 is mounted in the hollow space of the box-like oven door 3. The strut represents the outline of the viewing opening and extends between the two glass panels 13 and 14.

One lighting device is disposed in the hollow spaces on each side of the corresponding sections of the window strut 16. For the sake of simplicity, the lighting device is merely diagrammatically indicated by the outline of a bulb 17. So-called low-voltage bulbs are used in this case, preferably halogen lamps, having an operating voltage of approximately 12 V and a power consumption of approximately 5 watts. According to one embodiment shown in FIG. 1, corresponding lamp sockets 18 for the low-voltage bulbs 17 are mounted in the aforementioned hollow spaces. The supply of current to the lamp sockets 18 is provided by an electric supply line 19 as well as a plug contact 20 disposed between the oven muffle 1 and the oven door 3. In order to obtain optimal illumination of the baking space 5, the outside of the window strut 16 in the vicinity of the lighting devices is constructed as a reflector and has oblique reflector surfaces 21. Arrows indicate the maximum illumination of the baking space 5 by the rays of light emanating from the bulbs 17. As the drawings show, the food 6 is optimally illuminated from both sides of the viewing window 15 and the lighting device or devices themselves need not be visible from outside.

To this end, the outer glass panel 14 is only transparent in the vicinity of the viewing window 15, while it is colored outside the viewing window. The lighting devices are effectively protected from being spattered by the food 6 because the lighting devices are covered by the inner glass panel 13. Since low-voltage bulbs are used, very little space is required for accommodating the lighting devices. The illumination of the baking space 5 is of the best possible quality, especially when halogen lamps are used. Increased safety is provided because low voltage is used. Furthermore, the lighting device is relatively insensitive to jarring.

In the embodiment of FIG. 2, part of the oven muffle is shown having a side muffle wall 22, a muffle flange 23 and a rear muffle wall 24. The oven muffle is again surrounded by a thermal insulating layer 4. In the FIG. 2 embodiment, lighting devices are disposed in the two opposite side muffle walls 22. To this end, a lamp socket 18 is mounted behind a small opening 25 in the muffle wall 22, or in a small reflector plate representing a part of the muffle wall 22. The lamp socket 18 is surrounded on the sides and toward the back by the practically uninterrupted thermal insulating layer 4. The opening 25 is used for plugging in a low-voltage bulb 17 in the form of a halogen lamp, which in the illustrated embodiment is plugged into the opening 25 in a practically flush manner with a tapered base portion 27. The bulb is provided with electrical contact via its electrical connection elements 28 in the lamp socket 18. The electrical supply line 19 leading away from the lamp socket 18 is disposed within the thermal insulating layer 4. In the illustrated embodiment, a low-voltage halogen lamp is once again used that has an operating voltage of 12 V and an installed power of 5 watts. Virtually all of the bulb 17 protrudes into the baking space 5 and is surrounded by a curved glass covering 29, which may be screwed into a tubular thread of the muffle wall in a non-illustrated manner or secured on the muffle wall in some other manner. A reflector plate 26 substantially closes a larger opening 30 for the glass covering 29 and reflects the rays of light emanating from the bulb 17 in the direction toward the baking space 5. At the same time, the reflector plate forms a barrier for the heat or thermal radiation emanating from the baking space 5. A curved shade 31 projecting from the reflector plate and shielding the bulb 17 from the oven door is directly connected with the reflector plate 26, so that the bulb cannot be seen by the observer.

In the embodiments described above, the standard main or network voltage must be transformed to a low voltage value. A transformer required for this purpose is installed at some suitable point, or the transformer already provided for the control panel of the oven may be used for this purpose as well.

It is naturally possible within the scope of the invention to form the small opening 25 directly in the muffle wall. It is also possible for the lighting device described above to be used for ovens in which the food to be baked is heated by means of microwave energy, or with a combination of thermal and microwave energy. In these cases, it is an advantage that destruction of the bulb which protrudes virtually unprotected into the baking space due to the microwave energy is prevented because of the small size of the low-voltage bulbs, which may be halogen lamps. A further advantage is that when the bulb is disposed on the inside, microwave radiation out of the oven space is prevented without entailing complicated means of protection.

FIG. 3 shows a portion of the side muffle wall 22 of a baking oven, with exclusively microwave heating or combined microwave and thermal heating. A covering 33, which rests with a cantilevered-like bent-over flange 34 on the rear or outer surface of the muffle wall 22, is inserted into an opening 32 formed in the muffle wall, from outside the muffle wall 22. A dome-like portion of the covering 33 is provided with a great number of openings 35 in grid-like fashion and protrudes into the baking space 5. A retainer ring 36 is mounted on the inside of the muffle wall 22 and has four stay bolts 37 with threads, for example, disposed about the periphery thereof. The stay bolts 37 can be welded to the retainer ring. Mounted on the stay bolts 37 and on the flange 34 is a holder plate 38 which holds a lamp socket 39 in the middle portion thereof. The holder plate 38, which is preferably formed of sheet aluminum, has an extension 40 bent over at right angles, which passes through most of the covering 33 and is constructed in gable or rooflike fashion, as shown in FIG. 3. The inside of the extension 40 provides a reflector 41 for the bulb 17 and the outside thereof has a shade oriented toward the baking oven door, through which the bulb 17 and especially the halogen lamp is shielded from the eye of the observer. The covering 33 prevents the escape of microwaves through the opening 32 of the muffle wall. The aforementioned parts are braced against one another and against the muffle wall 22 by means of nuts 42.

The foregoing is a description corresponding in substance to German Application No. P 36 43 371.3, dated Dec. 18, 1986, the International priority of which is being claimed for the instant application, and which is hereby made part of this application. Any material discrepancies between the foregoing specification and the aforementioned corresponding German application are to be resolved in favor of the latter.

We claim:

1. Baking oven, comprising an electrical cooking device operating on normal household voltage, at least one boundary wall defining a baking space, at least one lighting device each including a first part in the form of a 12 volt halogen bulb, a second part in the form of an electrical connection for said bulb, and a lamp socket disposed on said at least one boundary wall having means for receiving said bulb in said lamp socket from inside said baking space with said bulb protruding substantially completely into said baking space, said boundary wall having an opening formed therein for receiving and closely surrounding one of said parts of said lighting device.

2. Baking oven, comprising an electrical cooking device at least one boundary wall defining a baking space, at least one lighting device each including a first part in the form of a 12 volt halogen bulb, a second part in the form of an electrical connection for said bulb, and a lamp socket disposed on said at least one boundary wall having means for receiving said bulb in said lamp socket from inside said baking space with said bulb protruding substantially completely into said baking space, said boundary wall having an opening formed therein for receiving and closely surrounding one of said parts of said lighting device, said at least one boundary wall having said opening being a muffle wall with one surface facing toward said baking space and another surface facing away from said baking space, said lamp socket facing said other surface of said muffle wall, said bulb including a lamp base portion and a connection portion, and only one of said portions protruding through said opening up to said lamp socket.

3. Baking oven according to claim 2, including a reflector disposed in the vicinity of said opening.

4. Baking oven according to claim 2, wherein said lighting device is disposed on at least one side muffle wall.

5. Baking oven according to claim 4, including an oven door, and a shade shielding said bulb from said oven door.

6. Baking oven according to claim 2, including an at least partially transparent glass covering mounted on said muffle wall and covering said bulb.

7. Baking oven according to claim 6, wherein part of said glass covering is in the form of a shade.

8. Baking oven according to claim 1, wherein said low-voltage bulb has an installed power consumption of 5 watts.

9. Baking oven according to claim 1, wherein said at least one boundary wall is an oven muffle having one surface facing toward said baking space and another surface facing away from said baking space, said lamp socket is secured so as to face said other surface of said muffle wall, and including a thermal insulating layer covering said lamp socket and surrounding said oven muffle.

10. Baking oven according to claim 9, including an oven door in which said lighting device is disposed.

11. Baking oven according to claim 10, including a plug contact disposed between said oven muffle and said oven door for electrically connecting said lighting device.

12. Baking oven according to claim 10, including a current conducting rail disposed between said oven muffle and said oven door for electrically connecting said lighting device.

13. Baking oven according to claim 1, wherein said electrical cooking device including means for heating food by microwave energy.

14. Baking oven according to claim 13, including a grid-like, microwave-tight covering mounted on said boundary wall.

15. Baking oven according to claim 14, wherein said boundary wall has one surface facing toward and another surface facing away from said baking space, and including a holder plate secured on said other surface of said boundary wall in the vicinity of said opening formed therein for retaining said lamp socket.

16. Baking oven according to claim 15, wherein said holder plate has a bent-over extension protruding through said opening formed in said boundary wall up to said grid-like covering, said extension being in the form of a shade and a reflector.

17. Baking oven, comprising an electrical cooking device at least one boundary wall defining a baking space, at least one lighting device each including a first part in the form of a bulb, a second part in the form of an electrical connection for said bulb, a lamp socket disposed on said at least one boundary wall having means for receiving said bulb in said lamp socket from inside said baking space with said bulb protruding substantially completely into said baking space, said boundary wall having an opening formed therein for receiving and closely surrounding one of said parts of said lighting device, said at least one boundary wall having said opening being a muffle wall with one surface facing toward said baking space and another surface facing away from said baking space, said lamp socket facing said other surface of said muffle wall, said bulb including a lamp base portion and a connection portion, and only one of said portions protruding through said opening up to said lamp socket, and a reflector disposed in the vicinity of said opening, said reflector being part of said muffle wall and having said opening formed therein, and said muffle wall having another opening formed therein being larger than said opening in said reflector, said reflector being disposed in said other opening.

18. Baking oven according to claim 17, including an oven door, said reflector including a shade shielding said bulb from said oven door.

19. Baking oven, comprising an electrical cooking device at least one boundary wall defining a baking space, at least one lighting device each including a first part in the form of a bulb, a second part in the form of an electrical connection for said bulb, a lamp socket disposed on said at least one boundary wall having means for receiving said bulb in said lamp socket from inside said baking space with said bulb protruding substantially completely into said baking space, said boundary wall having an opening formed therein for receiving and closely surrounding one of said parts of said lighting device, said at least one boundary wall having said opening being a muffle wall with one surface facing toward said baking space and another surface facing away from said baking space, said lamp socket facing said other surface of said muffle wall, said bulb including a lamp base portion and a connection portion, and only one of said portions protruding through said opening up to said lamp socket, said lighting device being disposed on at least one side muffle wall, an oven door, and a shade shielding said bulb from said oven door, said shade being part of a reflector disposed in the vicinity of said opening.

20. Baking oven, comprising an electrical cooking device at least one boundary wall defining a baking space, at least one lighting device each including a first part in the form of a first bulb, a second part in the form of an electrical connection for said first bulb, a first lamp socket disposed on said at least one boundary wall having means for receiving said first bulb in said first lamp socket from inside said baking space with said first bulb protruding substantially completely into said baking space, said boundary wall having an opening formed therein for receiving and closely surrounding one of said parts of said lighting device, said at least one boundary wall being an oven muffle having one surface facing toward said baking space and another surface facing away from said baking space, said first lamp socket being secured so as to face said other surface of said muffle wall, a thermal insulating layer covering said first lamp socket and surrounding said oven muffle, and an oven door in which said lighting device is disposed, said oven door including a viewing window having two sides and an inner glass panel, and said lighting device also including a second bulb in a second lamp socket, one of said bulbs and one of said lamp sockets being disposed beyond each respective side of said viewing window, and said bulbs being covered by said inner glass panel.

21. Baking oven according to claim 20, wherein said viewing window has an aperture, and said oven door has a strut surrounding said aperture, said strut having an outer surface in the form of a reflector facing toward said bulb bulbs.

* * * * *